(12) United States Patent
Kotlyar et al.

(10) Patent No.: US 9,110,726 B2
(45) Date of Patent: Aug. 18, 2015

(54) METHOD AND SYSTEM FOR PARALLELIZATION OF PIPELINED COMPUTATIONS

(75) Inventors: Vladimir Kotlyar, Stamford, CT (US); Mayan Moudgill, White Plains, NY (US); Yurly M. Pogudin, Woodstock, NY (US)

(73) Assignee: QUALCOMM Incorporated, San Diego, CA (US)

( * ) Notice: Subject to any disclaimer, the term of this patent is extended or adjusted under 35 U.S.C. 154(b) by 1348 days.

(21) Appl. No.: 12/513,838

(22) PCT Filed: Nov. 8, 2007

(86) PCT No.: PCT/US2007/084113
§ 371 (c)(1),
(2), (4) Date: Dec. 30, 2009

(87) PCT Pub. No.: WO2008/060948
PCT Pub. Date: May 22, 2008

(65) Prior Publication Data
US 2010/0115527 A1    May 6, 2010

Related U.S. Application Data

(60) Provisional application No. 60/865,253, filed on Nov. 10, 2006.

(51) Int. Cl.
*G06F 9/46* (2006.01)
*G06F 15/00* (2006.01)
*G06F 9/50* (2006.01)
*G06F 9/38* (2006.01)

(52) U.S. Cl.
CPC ............ *G06F 9/5066* (2013.01); *G06F 9/3885* (2013.01); *G06F 9/5027* (2013.01); *G06F 9/3826* (2013.01)

(58) Field of Classification Search
None
See application file for complete search history.

(56) References Cited

U.S. PATENT DOCUMENTS

| 4,866,637 | A | * | 9/1989 | Gonzalez-Lopez et al. .. 345/426 |
|---|---|---|---|---|
| 6,115,761 | A | * | 9/2000 | Daniel et al. .................... 710/57 |
| 6,842,848 | B2 | | 1/2005 | Hokenek et al. |
| 6,904,511 | B2 | | 6/2005 | Hokenek et al. |
| 6,912,623 | B2 | | 6/2005 | Hokenek et al. |
| 6,925,643 | B2 | | 8/2005 | Hokenek et al. |
| 6,968,445 | B2 | | 11/2005 | Hokenek et al. |
| 6,971,103 | B2 | | 11/2005 | Hokenek et al. |
| 6,990,557 | B2 | | 1/2006 | Hokenek et al. |

(Continued)

OTHER PUBLICATIONS

Carr et al., 1994, Improving the ratio of memory operations to floating-point operations in loops, ACM Transactions on Programming Languages and Systems, 16(6):1768-1810.

(Continued)

*Primary Examiner* — Abdullah Al Kawsar
(74) *Attorney, Agent, or Firm* — Knobbe Martens Olson & Bear LLP

(57) ABSTRACT

A method of parallelizing a pipeline includes stages operable on a sequence of work items. The method includes allocating an amount of work for each work item, assigning at least one stage to each work item, partitioning the at least one stage into at least one team, partitioning the at least one team into at least one gang, and assigning the at least one team and the at least one gang to at least one processor. Processors, gangs, and teams are juxtaposed near one another to minimize communication losses.

17 Claims, 2 Drawing Sheets

(56) References Cited

U.S. PATENT DOCUMENTS

| | | | |
|---|---|---|---|
| 7,251,737 | B2 | 7/2007 | Weinberger et al. |
| 7,428,567 | B2 | 9/2008 | Schulte et al. |
| 7,475,222 | B2 | 1/2009 | Glossner et al. |
| 7,593,978 | B2 | 9/2009 | Schulte et al. |
| 7,797,363 | B2 | 9/2010 | Hokenek et al. |
| 8,036,243 | B2 * | 10/2011 | Georgiou et al. ............. 370/467 |
| 2003/0159021 | A1 * | 8/2003 | Kerr et al. ..................... 712/218 |
| 2004/0172346 | A1 | 9/2004 | Kanekar et al. |
| 2004/0186846 | A1 | 9/2004 | Birdwell et al. |
| 2004/0186920 | A1 | 9/2004 | Birdwell et al. |
| 2005/0235276 | A1 * | 10/2005 | Dai et al. ...................... 717/140 |
| 2006/0095729 | A1 | 5/2006 | Hokenek et al. |
| 2006/0174236 | A1 | 8/2006 | Stein et al. |
| 2006/0277126 | A1 * | 12/2006 | Rosenbluth et al. ............. 705/35 |
| 2006/0288196 | A1 * | 12/2006 | Unsal et al. ................... 712/235 |
| 2008/0005544 | A1 * | 1/2008 | Jourdan et al. ................ 712/239 |
| 2009/0276432 | A1 | 11/2009 | Hokenek et al. |
| 2010/0122068 | A1 | 5/2010 | Hokenek et al. |
| 2010/0199073 | A1 | 8/2010 | Hokenek et al. |
| 2010/0199075 | A1 | 8/2010 | Hokenek et al. |
| 2010/0293210 | A1 | 11/2010 | Sima et al. |

OTHER PUBLICATIONS

Pugh, 1994, Counting solutions to Presburger formulas: how and why, Proceedings of the Association for Computing Machinery Programming Language Design and Implementation ("ACM PLDI") Conferences, 15 pp.

Balzola et al., Sep. 26, 2001, Design alternatives for parallel saturating multioperand adders, Proceedings 2001 International Conference on Computer Design, pp. 172-177.

Balzola, Apr. 2003, Saturating arithmetic for digital signal processors, PhD Thesis, Lehigh University.

Glossner et al, 2000, Trends in compilable DSP architecture, IEEE Workshop in Signal Processing Systems, pp. 1-19.

Glossner et al., Apr. 2001, Towards a very high bandwidth wireless battery powered device, IEEE Computer Society Workshop in VLSI, pp. 3-9.

Glossner et al., Nov. 2002, A multithreaded processor architecture for SDR, The Proceedings of the Korean Institute of Communication Sciences, 19(11):70-84.

Glossner et al., Nov. 11-12, 2002, Multi-threaded processor for software-defined radio, Proceedings of the 2002 Software Defined Radio Technical Conference, vol. 1, 6 pp.

Glossner et al., Jan. 2003, A software defined communications baseband design, IEEE Communications Magazine, 41(1):120-128.

Glossner et al., Sep. 22, 23, 2003, Multiple communication protocols for software defined radio, IEEE Colloquium on DSP Enable Radio, ISIL, Livingston, Scotland, pp. 227-236.

Glossner et al., Mar. 4, 2004, 6. The Sandbridge sandblaster communications processor, Software Defined Radio: Baseband Technologies for 3G Handsets and Basestations, John Wiley & Sons, Ltd., pp. 129-159.

Jinturkar et al., Mar. 31-Apr. 3, 2003, Programming the Sandbridge multithreaded processor, Proceedings of the 2003 Global Signal Processing Expo (GSPx) and International Signal Processing Conference (ISPC), Dallas, Tx.

Schulte et al., Nov. 19, 2000, Parallel saturating multioperand adders, Cases '00, pp. 172-179.

Schulte et al., Nov. 2004, A low-power multithreaded processor for baseband communication systems, Lecture Notes in Computer Science, 3133:393-402.

Hammond, Lance Stirling, "Hydra: A Chip Multiprocessor With Support for Speculative Thread-Level Parallelization", (Mar. 2002).

Notification of Transmittal of the International Search Report and the Written Opinion of the International Searching Authority, or the Declaration for PCT/US2007/084113, filed Nov. 8, 2007.

International Preliminary Report on Patentability (IPER), PCT/US2007/084113, filed Nov. 8, 2007.

P. Feautrier, "Array Expansion", In the Proceedings of the $2^{nd}$ International Conference on Suppercomputing, 1988.

William Pug, "Counting Solutions to Presburger Formulas: How And Why", In the Proceedings of the ACM PLDI Conferences, 1994.

S. Carr and K. Kennedy, "Improving the Ratio of Memory Operations to Floating-Point Operations in Loops", ACM Transations on Programming Languages and Systems, vol. 16, No. 6, pp. 1768-1810, 1994.

European Search Report dated Apr. 12, 2009 for European Patent Application No. 07864131.3.

Bokhari, "Partitioning Problems in Parallel, Pipelined, and Distributed Computing", IEEE Transactions on Computers, vol. 37, No. 1, Jan. 1, 1988, pp. 48-57.

Murthy et al., "Task Assignment in a Multiprocessor System", Microprocessing and Microprogramming,, Amsterdam, Netherlands, vol. 26, No. 1, Mar. 1, 1989, pp. 63-71.

Hajjar et al., "Assigning Modules to Processors in Linear Arrays and Rings", Proceedings of the Annual International Phoenix Conference on Computers and Communications, Scottsdale, Arizona [Proceedings of the Annual International Phoenix Conference on Computers and Communications], Washington, IEEE Comp. Soc. Pres, Mar. 22, 1989, pp. 510-514.

Glossner et al., Sep. 2004, Sandblaster Low-Power Multithreaded SDR Baseband Processor, Proceedings of the 3rd Workshop on Applications Specific Processors (WASP'04), Stockholm, Sweden, pp. 53-58.

William Pugh, "Counting Solutions to Presburger Formulas: How and Why", In the Proceedings of the ACM PLDI Conferences 1994.

\* cited by examiner

METHOD AND SYSTEM FOR PARALLELIZATION OF PIPELINED COMPUTATIONS

CROSS-REFERENCE TO RELATED APPLICATIONS

This application relies for priority upon U.S. Provisional Patent Application Ser. No. 60/865,253, filed on Nov. 10, 2006, the contents of which are incorporated herein by reference.

FIELD OF THE INVENTION

This invention relates to methods for computational pipelining. More specifically, this invention relates to a method for parallel pipelining of computations.

DESCRIPTION OF THE RELATED ART

The term "computation pipeline" refers to a sequence of computational steps, each of which consume data produced by one or more previous steps. The results are then used in subsequent steps. For purposes of this discussion, "computational pipeline" will be used in this context.

The term "stage" typically refers to computational steps such as those that make up a computational pipeline. If a computational process involves more than one stage, the stages may be labeled A, B, C, etc., as part of a naming convention. Each stage, labeled "x," uses only data from preceding stages.

If the invocation of a stage is given a numerical identifier, e.g., 1, 2, 3, etc., then the i-th iteration of a step starts only after the previous steps have completed their i-th execution.

A simple example of a pipeline is one where each computational stage depends only upon its immediate predecessor. Therefore, for a simple pipeline, once a stage completes its i-th execution, the immediate successor stage may initiate its i-th execution.

As may be appreciated by those skilled in the art, stages may be executed in many possible, different orders. For a single processor machine, for a simple pipeline containing two stages, A and B, each with three invocations, 1, 2, and 3, there are numerous possible execution orders. For example, one execution order may be A0, A1, A2, B0, B1, A3, B2, etc. A standard operating order is to execute the 0s first, followed by the 1s, etc. As a result, the standard execution order is A0, B0, A1, B1, A2, B2, A3, etc.

In the context of coarse pipelining, it is assumed that many processors will be relied upon. Typically, the number of processors is equal to or greater than the number of stages. As a result, in such a case, it is assumed that each stage is assigned to a different processor. A stage begins as soon as its predecessor is completed. Looking at a dynamic picture of a process, the invocations of the stages might appear as follows:

TABLE 1

| Processor | Execution #1 | Execution #2 | Execution #3 | Execution #4 |
|---|---|---|---|---|
| #1 | A0 | A1 | ... | ... |
| #2 |  | B0 | B1 | ... |

The information that is passed between the stages, A and B, is generally of an identical shape for all execution counts of those stages. In the Arithmetic Logic Unit ("ALU") of a pipelined processor, the information may consist of only a few words. In a systolic array, the information that is passed between the stages also may consist only of a few words. The "processors" executing these stages are fixed functions with dedicated hardware to implement or effectuate the communication.

In a coarse pipeline, processors executing the stages are similar to general purpose Central Processing Units ("CPUs") without dedicated communication resources. In particular, the target is a multi-processor, using either a shared memory or message passing to communicate between processors.

In this context, it is necessary for the amount of computation per stage be sufficient to outweigh the costs of inter-stage (i.e., inter-processor) communication. This, in turn, means that the values communicated between the stages may be fairly large, which is the case with array slices.

Coarse pipelining provides one template for distributing work to processors. A more traditional approach to parellization is to first complete all of the A stages, then all of the B stages, and so on. If two (2) processors are used and the two stages each include a count of four (4) invocations, the following schedule may be employed:

TABLE 2

| Processor | Execution #1 | Execution #2 | Execution #3 | Execution #4 |
|---|---|---|---|---|
| #1 | A0 | A2 | B0 | B2 |
| #2 | A1 | A3 | B1 | B3 |

As might be appreciated by those skilled in the art, there are at least two draw-back associated with this approach.

The first draw-back is associated with the latency of the first result. Specifically, the first result will be obtained only after all of the counts except for the last stage have been executed. In the example provided in Table 2, B0 will be complete only after three (3) time units (or invocations) whereas with coarse pipelining, B0 will be complete after two (2) time units. As may be appreciated by those skilled in the art, this difference becomes more pronounced with a greater number of pipeline stages and a higher number of execution counts.

The second draw-back is associated with memory requirements. In the traditional approach, the data produced by all of the counts of a particular stage is stored before the next stage is executed. In the case of coarse pipelining, some of the data produced by all of the stages needs to be stored simultaneously. If the pipeline is a simple one, only one segment of data for each stage must be stored. Further, by changing the amount of work done in each stage, it is possible to control the amount of data that must be stored.

Both latency and memory requirements may be decreased by reducing the amount of work performed by each stage. Of course, this results in an increase in the number of execution counts. Increasing the number of execution counts, however, may decrease the overall efficiency of the computation, since more time will be expended in inter-stage synchronization and communication.

It is possible to achieve similar control over both the latency and memory requirements by using a non-coarse pipelined schedule, such as the one provided in Table 3, below.

TABLE 3

| Processor | Execution #1 | Execution #2 | Execution #3 | Execution #4 |
|---|---|---|---|---|
| #1 | A0 | B0 | A2 | B2 |
| #2 | A1 | B1 | A3 | B3 |

In the schedule provided in Table 3, each processor receives a packet of information and then processes that information to completion.

As may be understood by those skilled in the art, this processing schedule may not be possible when there exist forward dependencies between successive executions of the same stage. In other words, this may not be possible when the first iteration of A1 cannot be started until the last iteration of A0 is completed.

As may also be appreciated by those skilled in the art, another scenario in which a non-pipelined schedule may not be executable occurs when the input data for the first stage itself is being produced in a pipelined fashion. For example, if the data for A1 only becomes available some time after the data for A0, A1 cannot be initiated at the same time as A0. This scenario occurs in environments where the input is produced in a real-time stream, such as for wireless or multimedia.

SUMMARY OF THE INVENTION

It is, therefore, one aspect of the invention to provide a method of parallelizing a pipeline having stages that perform work on a sequence of work items. The method includes selecting the amount of work each work item performs, determining the number of stages, partitioning each stage into a number of teams and number of gangs of processors in the teams, and assigning teams and gangs to specific processors.

Another aspect of the invention is to provide a method where the amount of work for each work item is a function of the amount of available memory and/or overhead synchronization, and/or the number of stages is a function of load balance and/or parallelism, and/or the number of teams and gangs is a function of load balance and/or throughput.

A further aspect of the invention is to provide a method where the number of gangs in a team is a function of work dependency of a stage, efficiency of parallelization, memory utilization and/or latency.

Still one additional aspect of the invention is to provide a method where the assignment to specific processors is a function of the communication network between processors and/or access to memory regions.

It is yet another aspect of the invention to provide a method where a pipeline structure exists and the selecting the amount of work, determining the number of stages and assigning processor is an adjustment of the amount of work and the number of stages and a reassignment of the processors of the existing pipeline structure to achieve parallelization.

An aspect of the invention is to provide a method that includes rewriting the code for the stages and data objects to reflect the teams and gangs; and write code for communication for input and output data and for synchronization of the teams and gangs.

Another aspect of the invention includes analyzing dependency and data flow and eliminating spurious dependencies.

One further aspect includes providing a buffer for data produced by M teams, gangs or stages and used by N teams, gangs or stages; and wherein the buffer has at least M+N areas for data.

In still another embodiment of the invention, areas assigned to the M teams, gangs or stages and the N teams, gangs or stages are continuously reassigned so that data stored in an area by the M teams, gangs or stages in one cycle is accessed by the N teams, gangs or stages in the next or other subsequent cycles.

In yet another embodiment of the invention, the buffer has more than M+N areas for data to account for cycle differences between the availability of data to be stored and when it can be accessed.

Further, the invention includes instructions for storing data include a send reserve function to obtain a buffer area suitable for the given iteration and a send commit function indicating that the data is stored and available for reading; and the instructions for accessing data include a receive reserve function to obtain data from a buffer area suitable for the given iteration and a receive commit function indicating that the data is no longer needed.

In addition, the invention provides for a processor system that includes parallel pipeline stages that perform work on a sequence of work items and a buffer for data produced by M stages and used by N stages, the buffer comprising at least M+N areas for data stored by the M stages and accessed by the N stages.

The processor includes features such as where the areas assigned to the M stages and the N stages are continuously reassigned so that data stored in an area by the M stages in one cycle is accessed by the N stages in the next or other subsequent cycles.

In other embodiments, the buffer has more than M+N areas for data to account for cycle differences between the availability of data to be stored and when it can be accessed.

In still further embodiments, the instructions for storing data include a send reserve function to obtain a buffer area suitable for the given iteration and a send commit function indicating that the data is stored and available for reading; and the instructions for accessing data include a receive reserve function to obtain data from a buffer area suitable for the given iteration and a receive commit function indicating that the data is no longer needed.

In at least one additional embodiment, some of the stages are partitioned into a number of teams and number of gangs in the teams; and M and N each represent the total number teams, gangs and stages.

Still further features of the invention will be appreciated by those skilled in the art in view of the description that follows and the drawings appended hereto.

BRIEF DESCRIPTION OF THE DRAWINGS

The invention will now be described in connection with the drawings appended hereto, in which.

DESCRIPTION OF EMBODIMENT(S) OF THE INVENTION

Figure 1:
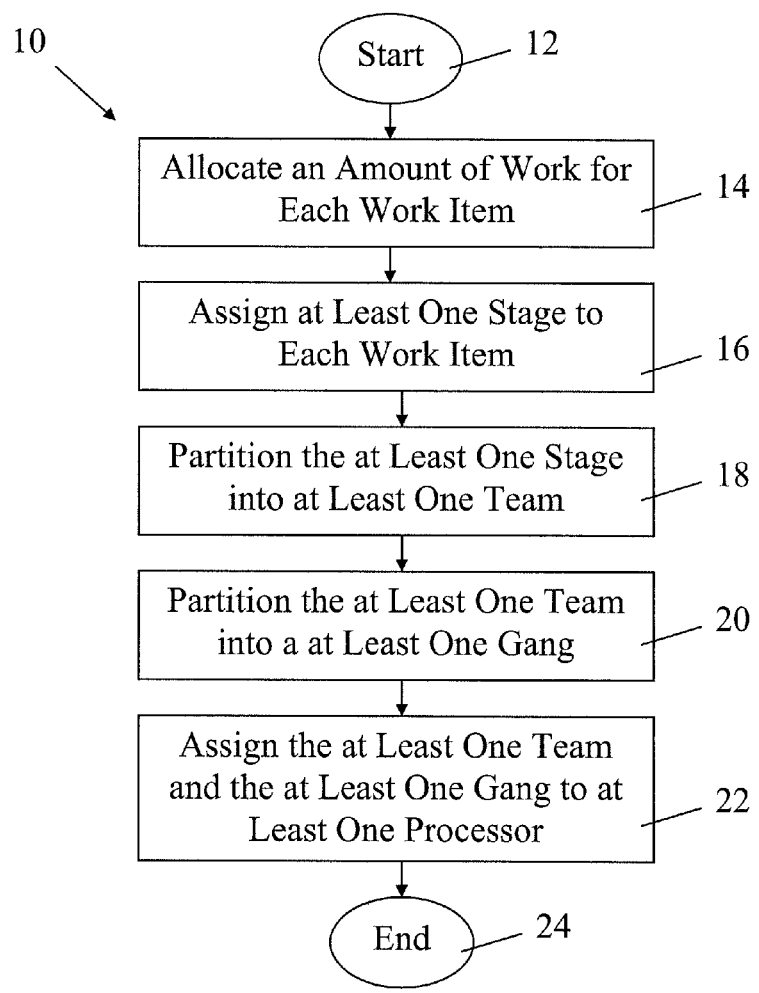
FIG. 1 is a flow diagram of the logic employed by embodiment(s) of the invention.

Reference will be made to the figures appended hereto to illustrate one or more features of the invention.

With reference to the discussion of the related art, it has been assumed that each stage is mapped exactly onto one processor. As should be appreciated by those skilled in the art, this is not required for data processing. It is possible to implement a stage using multiple processors and different stages using differing numbers of processors. One example of this approach is provided in Table 4, below, where five (5) processors are used.

TABLE 4

| Processor | Execution #1 | Execution #2 | Execution #3 | Execution #4 |
|---|---|---|---|---|
| #1 | A0 | A1 | A2 | |
| #2 | A0 | A1 | A2 | |
| #3 | A0 | A1 | A2 | |
| #4 | | B0 | B1 | B2 |
| #5 | | B0 | B1 | B2 |

As may be appreciated by those skilled in the art, in some cases, as in the example provided by Table 4, the computations within a stage may include a parallelism within them that may be exploited further by using more conventional parallelization techniques. For purposes of this discussion, as would be appreciated by those skilled in the art, a group of processors that implement a single stage will be referred to as a "gang." Therefore, referring back to Table 4, stage A is implemented using a gang of three processors while stage B is implemented using a gang of two processors. As should be appreciated by those skilled in the art, one reason to rely on the use of gangs is to increase the amount of work (or increase the amount of data processed) done in parallel. When processed in this manner, the time needed to complete the task may be reduced.

One additional reason to use gangs for processing is to improve processor utilization. Consider an example with two stages, A and B, where processing of stage A takes 1.5 times (1.5×) as long to complete than stage B. In this case, if stages A and B are each implemented using only one processor, stage B will be idle for about 33% of the total processing time. As may be appreciated by those skilled in the art, stage B is idle because it is "waiting" for stage A to complete its processing before both stages may proceed to the next processing cycle. However, as suggested by Table 4, if gangs of processors are utilized, it is possible to engineer processing so that stages A and B both are completed in approximately the same time period.

A "team" approach may also be employed to realize certain processing improvements. One example of this approach involves a simple pipeline with two stages, A and B. Stage A takes one (1) unit of time to complete, while stage B takes two (2) units of time to complete. Stage $B_k$ cannot start before stage $A_k$ is completed. To improve processor utilization, a gang of two processors may be assigned to stage B, while one processor (or a gang including only one processor) is assigned to stage A. In this example, processing proceeds as indicated by Table 5, below:

TABLE 5

| Processor | Execution #1 | Execution #2 | Execution #3 | Execution #4 | Execution #5 |
|---|---|---|---|---|---|
| #1 | A0 | A1 | A2 | A3 | |
| #2 | | B0 | B1 | B2 | B3 |
| #3 | | B0 | B1 | B2 | B3 |

As may be appreciated by those skilled in the art, there are situations where it may not be possible to efficiently partition the work performed of a single stage. In such situations, it is possible to use additional processors by assigning them to the stage and executing different iterations of the stage concurrently. Table 6, below, provides an example of such an arrangement.

TABLE 6

| Processor | Execution #1 | Execution #2 | Execution #3 | Execution #4 | Execution #5 |
|---|---|---|---|---|---|
| #1 | A0 | A1 | A2 | A3 | |
| #2 | | B0 | B0 | B2 | B2 |
| #3 | | B1 | B1 | B3 | B3 |

In the example illustrated in Table 6, stage B is assigned a team of two gangs. Each gang equates to a single processor (processor #2 or processor #3) in this example. The number of teams, therefore, is the number of iterations being processed concurrently for the given stage.

A more complex example of this concept is illustrated in Table 7. In Table 7, stage B requires four (4) units of time for processing. In this example, the four time units required to process stage B may be parsed efficiently between two processors, rather than four processors. In addition, when divided between two (2) processors, stage B requires only two (2) time units to complete its processing. Accordingly, in this example, a team of two gangs may be assigned to stage B. Each gang includes two (2) processors.

TABLE 7

| Processor | Execution #1 | Execution #2 | Execution #3 | Execution #4 | Execution #5 | Execution #6 |
|---|---|---|---|---|---|---|
| #1 | A0 | A1 | A2 | A3 | A4 | |
| #2 | | B0 | B0 | B2 | B2 | |
| #3 | | B0 | B0 | B2 | B2 | |
| #4 | | | B1 | B1 | B3 | B3 |
| #5 | | | B1 | B1 | B3 | B3 |

With the example illustrated in Table 7 in mind, therefore, if the work for a thread is divisible efficiently between M threads, there may be an advantage to provide N teams of M threads assigned to a particular stage. In such a case, it may be said that the team includes M*N threads or that it includes N teams.

Load balancing is another factor that is considered in data processing, as may be appreciated by those skilled in the art. Put simply, computation in a pipeline proceeds at the rate of the slowest stage. In the example illustrated in Table 8, the pipeline includes four stages, A, B, C, and D. If three of the stages each take one (1) unit of time to process and one of the stages takes two (2) units of time to process, a new execution count will occur once every two (2) units of time. In the example illustrated in Table 8, stage C takes two (2) units of time to process.

TABLE 8

| Processor | Execution #1 | Execution #2 | Execution #3 | Execution #4 | Execution #5 | Execution #6 | Execution #7 | Execution #8 | Execution #9 | Execution #10 | Execution #11 |
|---|---|---|---|---|---|---|---|---|---|---|---|
| #1 | A0 | A1 | A2 | A3 | | | | | | | |
| #2 | | B0 | B1 | B2 | B3 | | | | | | |
| #3 | | | C0 | C0 | C1 | C1 | C2 | C2 | C3 | C3 | |
| #4 | | | | | D0 | | D1 | | D2 | | D3 |

Ideally, of course, it is desirable to design processing such that the amount of computation for each stage is about the same. This is called "load balancing."

As discussed above, gangs may be employed to assist with load balancing. Of course, as may be appreciated by those skilled in the art, load balancing may also include or require splitting a stage into two or more stages. Alternatively, load balancing may include combining two (2) or more stages together. Other combinations and rearrangements of work also may accomplish this same result, as may be appreciated by those skilled in the art.

Buffering also may be employed to assist with multi-stage processing. In a simple pipeline, data is written by a stage and is read by its immediate successor stage. In a simple, coarse pipeline, a segment of data is written by a stage and then consumed by its successor. As may be appreciated by those skilled in the art, reading and writing occur simultaneously. As a result, in one example, stage B will be reading the data for count n while stage A will be writing the data for count n+1. For the sake of efficiency, it is desirable for both the reading and writing operations to proceed simultaneously or in parallel. Of course, when performing the reading and writing operations simultaneously, it is desirable to avoid a situation where stage A overwrites the data being read by stage B before stage B has read all of the data. As should be appreciated by those skilled in the art, a technique referred to as "double-buffering" addresses this problem.

With respect to double-buffering, the data storage area is twice as large as the data that is communicated between the stages. If the data storage area is divisible in two parts, an upper part and a lower part, both parts of the data storage area may be used at any given time. For example, during one count, the predecessor stage may write to the lower half of the data storage area while the successor stages reads from the upper half of the data storage area. During the next execution count, the positions are swapped such that data is written to the upper half of the data storage area while data is read from the lower half of the data storage area.

Generally, there may be a number of writers, M, and a number of readers, N, for a given pipeline. The write stage may be implemented using a team of M gangs. The reader stage may be implemented using N gangs. If so, it may be necessary to employ an extension of double-buffering, which is known as M+N buffering.

In the discussion to this point, it should be understood that the lifetime of a segment of data is one (1) count. In other words, data produced by one stage during count n will be consumed by another stage during the count n+1. There may, of course, be instances where a segment of data may need to be stored for a longer period of time. In some instances, the successor stage may use data segments from two or more counts of the preceding stage. This example is illustrated in Table 9, below. In this case, the stage B0 relies on and uses the results (or data) from both stages A0 and A1.

TABLE 9

| Processor | Execution #1 | Execution #2 | Execution #3 | Execution #4 |
|---|---|---|---|---|
| #1 | A0 | A1 | A2 | |
| #2 | | | B0 | B1 |

One possible alternative to this scheme is illustrated by Table 10. In Table 10, one or more data segments may be used from stages that do not immediately preceed the producing stage. In such cases, the buffering algorithm must reserve additional space for storage of data to avoid data being overwritten during various iterations. In the illustrated example, the stage C0 uses the results of both of stages A0 and B0.

TABLE 10

| Processor | Execution #1 | Execution #2 | Execution #3 | Execution #4 | Execution #5 |
|---|---|---|---|---|---|
| #1 | A0 | A1 | A2 | | |
| #2 | | B0 | B1 | B2 | |
| #3 | | | C0 | C1 | C2 |

As may be appreciated by those skilled in the art, it may also be desired to generate a pipeline schedule. A coarse pipeline schedule may be generated when it is desired for a particular task to meet a particular latency. In such a case, the computation is divided into stages, and the number of gangs per stage is selected so that each stage takes less time than the latency target. As should be appreciated by those skilled in the art, it is desirable for the processor requirements for this schedule not to exceed the total number of available processors. Once the schedule is selected, the inter-stage buffers are generated.

It is also possible to generate a coarse pipeline schedule in a memory constrained environment. If all stages are collections of loop nests, the amount of work done by each stage may be altered by changing the number of iterations of the outermost loop executed per count. In such a case, a load-balanced schedule is generated. Then, the amount of memory required for the buffers is computed. The amount of work done is then scaled by the stages until sized appropriately for the available memory.

As may be appreciated by those skilled in the art, it is also possible to produce a coarse-pipelined code manually. In one contemplated example, a standard imperative language may be used with support for parallel processing, such as C augmented by the pthreads standard threading library. Relying on this language, for example, tasks may be manually partitioned into stages. In addition, the code for each stage may be partitioned into separate functions. Each function, then, may be invoked on a unique processor using an explicit pthread_create() call or its equivalent. With a shared-memory multi-processor, communication between the threads/stages may be effectuated via the memory, with synchronization performed manually or via a mechanism such as semaphores.

For the sake of simplicity, a pipeline computation may be expressed as in Codes Segment 1, which follows:

---
Code Segment 1
---
```
for iteration i = 0, 1, 2, . . . {
    Stage1( );
    Stage2( );
    . . .
    StageN( );
}
```
---

As may be appreciated by those skilled in the art, it is not required for the computation to be expressed in the form provided by Code Segment 1. However, any pipeline computation is expressible in this form, since the computation consists of stages that perform work on a sequence of work items (or iterations).

Parallelization may include the following steps: (1) work unit adjustment, (2) stage adjustment, and (3) assignment of gangs and teams to stages. With respect to work unit adjustment, the amount of work for each work item may be adjusted in at least one of two ways. The work items may be subdivided per stage to reduce memory consumption. Alternatively, the work items may be enlarged per stage to reduce synchronization overhead. With respect to stage adjustment, one or more stages may have to be combined or sub-divided to improve load balance or to expose opportunities for parallelization. With respect to the assignment of gangs and teams to stages, gangs and teams of processors may be assigned to stages based on load balancing or real-time requirements. For example, if a stage k requires $W_k$ units of work, it is desirable for all of the stages to fulfill the ratio $W_k/P_k$ in approximately the same manner. With respect to the ratio $W_k/P_k$, $P_k$ is the number of processors assigned to stage k.

For real-time throughput requirements, it is presumed that the pipeline must complete work on each item within a time T. If so, a minimum number of processors assigned to each stage will be selected according to equation (1), which is provided below.

$$P_k = \text{ceiling}(W_k/T) \quad (1)$$

There are at least four factors that guide the division of teams into gangs: (1) work dependencies, (2) efficiency of parallelization, (3) memory utilization, and (4) latency requirements. With respect to work dependencies, if the work for stage k on iteration count j depends on the work for stage k on the iteration count j−1, the two iterations cannot be executed concurrently. In this case, the team for the stage cannot be subdivided. With respect to efficiency of parallelization, the computation for a stage may be inherently sequential or may be split only into a preferred number of partitions. With respect to memory utilization, if a stage uses M gangs, the stage requires M copies of the associated data. With respect to latency requirements, relying on the use of more gangs, which work independently, increases the time for any given iteration to be processed.

Assignment to physical processors also is a factor taken into account with respect to parallel processing. As may be appreciated by those skilled in the art, the cost of communicating between different processors or a parallel computer is not uniform. Depending upon the communication network, some pairs of processors may communicate with one another more quickly than other pairs of processors. Similarly, the cost of access to various memory regions is not uniform. Accordingly, the performance of the final parallel program depends, at least in part, upon the assignment of stages to processors and data to memories (or memory allocations).

Provided in the order of importance, there are three guidelines to be followed with respect to assignment of stages to physical processors. First, it is desirable to assign gangs to processors that are closest together. Second, it is desirable to assign teams to processors that are close together. Third, if stage A and stage B communicate with one another, it is desirable to map the gangs for stages A and B in such a manner to minimize the cost of transmitting data from stage A to stage B or vice versa. After work unit adjustment, stage adjustment, and the assignment of gangs and/or teams to processors, a transformation of the original pipeline is created that follows Code Segment 2, below:

---
Code Segment 2
---
```
for iteration I' = 0, 1, 2, . . . {
    Stage1( );
    Stage2( );
    . . .
    StageN'( );
}
```
---

Implementation of the parallel program will now be discussed. After adjustment, the new stages and iterations may differ in size from the original pipeline. As may be appreciated by those skilled in the art, the new stages and iterations continue to constitute a pipeline. For each stage k, certain parameters are realized including the gang size $P_k$, the number of gangs in the team $M_k$, and the assignment of the processors in the team to physical processors.

The process of implementing the final parallel program may be divided into the following steps or portions (among others), as would be appreciated by those skilled in the art: (1) stage rewriting, (2) data object rewriting, and (3) communication generation. With respect to stage rewriting, each iteration of the stage k may be partitioned among $P_k$ processors, since $P_k$ refers to the size of each gang. It is desirable for the code for the stage to be partitioned. The result may be summarized as a sub-program PartitionedStagek(t), where t is the index of the processor within the gang that executes the partition. With respect to data object rewriting, references to the original data objects used by the stage are transformed to refer to areas where the objects are allocated. With respect to communication generation, it is desirable to insert code to communicate input and output data. In addition, it is desirable to insert code to synchronize processes in the gangs.

An example of code to be run on each physical processor is provided by Code Segment 3, below:

---
Code Segment 3
---
```
Workstagek (p : processor_index) {
    Let be the index of the processor in its gang
    Let G be the index of the gang within the team
    Let Mk be the number of gangs
    for iteration I = G, G+Mk, G+2*Mk, . . . , G+j*Mk, . . . {
        receive data from the preceding stages
        PartitionedStagek(t);
        Send data to the succeeding stages
    }
}
```
---

The final parallel program consists of several code fragments, like the one set forth above, one for each stage, together with the means for starting these fragments on the parallel processors.

An efficient implementation of communication buffers will now be described. Here, it is assumed that the parallel computer is capable of copying data between different memory regions. On a shared memory parallel computer, this may include nothing more than a library routine for explicitly copying data. As may be appreciated by those skilled in the art, the copying functionality may be a hardware mechanism specially designed to copy asynchronously. On a distributed memory machine, the copying functionality may be a library routine implemented on top of message passing primitives. For clarity, it is assumed that the computer incorporates a shared memory and that a library routine "copy(dest,src,n)" is available to copy n bytes from location "src" to location "dest". Of course, as may be appreciated by those skilled in the art, this assumption does not preclude implementation of the techniques of a distributed memory machine.

The communication buffer may be an abstract data type with at least the following functions, coded in C language for clarity, as embodied in Code Segment 4:

Code Segment 4

```
Typedef ... Buffer;
byte * send_reserve (Buffer buf, int iteration);
void send_commit (Buffer buf, int iteration);
byte * receive_reserve (Buffer buf, int iteration);
void receive_commit (Buffer buf, int iteration);
```

The send_reserve( ) function obtains the buffer area suitable for the given iteration. The send_commit( ) function marks the data as available for use by the received side. The receive_reserve( ) function obtains the data suitable for the given iteration. The reserve_commit( ) function indicates that the data is no longer needed.

Using these functions, send and receive phases of the Workstagek( ) routine may be implemented as follows, for example, by Code Segment 5:

Code Segment 5

```
sending data:
    p = send_reserve (buffer, i);
    copy outgoing data into p
    send_commit (buffer, i);
receiving data:
    q = receive_reserve (buffer, i);
    copy incoming data out of q
    receive_commit (buffer, i)
```

In many cases, copying data to/from communication buffers may be avoided if the PartitionedStagek( ) routine uses the data directly from the buffers. In such a case, a possible implementation of WorkStagek( ) is detailed in Code Segment 6, below:

Code Segment 6

```
WorkStagek(proc : processor_index) {
    Let t be the index of the processor in its gang
    Let G be the index of the gang within the team
    Let Mk be the number of teams
    for iteration I = G, G+Mk, G+2*Mk, ..., G+j*Mk, ..., {
        p = send_reserve (Buffer, i)
        q = receive_reserve (Buffer, i);
        PartitionedStagek(p, q, t);
        send_commit (Buffer, i);
```

Code Segment 6

```
        receive_commit (Buffer, i);
    }
}
```

Possible implementations of buffer communication functionality will now be discussed.

Uniform memory access is also an area to be addressed with respect to pipelined processing. In this context, it is assumed that K bytes are to be communicated from stage A to stage B. Furthermore, it is assumed that there are M gangs associated with stage A, and N gangs associated with stage B. It is also assumed that there are at most M+N iterations of the pipeline being executed concurrently between the teams for stage A and for stage B. As such, at least M+N instances of the data items are expected to be communicated between the stages A and B. Each instance is referred to as a "slot".

It is assumed in this example that Z is the total number of slots. It is also assumed that each slot has a size K. Each iteration i is assigned slots in round-robin fashion according to the following formula:

$$b = i \bmod Z \quad (2)$$

The communication buffer abstract data type is comprised of three arrays of length Z each. For definitional purposes, send_iter is an array of integers, recv_iter is an array of integers, and slots is an array of slots. In C language we would express this as illustrated below in Code Segment 7:

Code Segment 7

```
typedef struct {
    int send_iter[Z];
    int recv_iter[Z];
    byte slots[Z][K];
} Buffer;
```

Initially, recv_iter[i] is set to −1 as follows: recv_iter[i]=−1, for all i between 0 and Z−1. In addition, the variable send_iter[i] is set to i as follows: send_iter[i]=i, for all i between 0 and Z−1. The implementation of the send/receive functions follows. For C language notation is used. Equivalent implementations can be obtained using any standard programming language, such as C++, assembly, Matlab, as would be appreciated by those skilled in the art. Code Segment 8 provides one example.

Code Segment 8

```
byte * send_reserve (Buffer *B, int iteration) {
    int slot = iteration % Z;
    wait until B->send_iter[slot]==iteration;
    return B->slots[slot];
}
void send_commit (Buffer *B, int iteration) {
    int slot = iteration % Z;
    B->recv_iter[slot] = iteration;
}
byte * receive_reserve (Buffer *B, int iteration) {
    int slot = iteration % Z;
    wait until B->recv_iter[slot]==iteration;
    return B->slots[slot];
}
void receive_commit (Buffer *B, int iteration) {
    int slot = iteration % Z;
    B->send_iter[slot] = iteration + Z;
}
```

The reserve routine(s) operate by waiting until the slot assigned to iteration is ready for the reserve routine(s). When slot s is ready for the sender, send_iter[s]=i. Similarly, when slot s is ready for the receiver, recv_iter[s]=i.

Alternatively, the commit routines indicate when the slot is ready for the next operation. If the current iteration is i, then the next iteration is i+Z. The sender signals the receiver and vice versa.

The benefit of this organization is that it requires no explicit synchronization between the multiple senders and receivers. The synchronization is implicit due to the round-robin assignment of iterations to slots.

Non-uniform memory access is another area to be addressed in pipelining.

The Buffer operation may be modified slightly to deal with gangs distributed across multiple processors and multiple memory regions.

Again, it is assumed that stage A sends data to stage B. Also, it is assumed that M gangs are assigned to stage A and that N gangs are assigned to stage B. Furthermore, it is assumed that there are M memory regions $R_1 \ldots R_M$ and $Q_1 \ldots Q_N$, which have affinity to the gangs. In other words, it is assumed that j is one of the gangs running stage A. Then, the processors in the gang may access memory region Rj more quickly than other regions. Similarly, it is assumed that k is one of the gangs running stage B. In this case, the processors in the gang may access memory region $Q_k$ more quickly than other regions. Moreover, it is assumed that storing into any "far" memory region is faster than loading from that "far" memory region.

As may be appreciated by those skilled in the art, a number of implementations are possible that reduce non-local memory accesses. In one implementation, Z=W*N buffers are used. In this case, the buffers satisfy the following formula: Z≥M+N. One possible choice, among others, is W=ceiling((M+N)/N). In this case, rather than considering the send_iter[ ], recv_iter[ ] and storage[ ] arrays as being indexed by a one-dimensional slot index, they may be considered as being indexed by a two dimensional slot index, which is detailed in Code Segment 9, as follows:

Code Segment 9

```
typedef struct {
    int send_iter[N][W];
    int recv_iter[N][W];
    byte storage[N][W][K];
} Buffer;
```

The 2-D slot index may be described as follows: <u,v>=<s/W, s mod W>, where s=i mod (W*N). As such, each array segment or slice, recv_iter[j][ ] and storage[j][ ][ ], may be stored in the region $Q_j$. In this manner, the receiver gang that performs the iteration i need only to load from the local region $Q_j$, with j=i mod N. The sender teams then perform non-local stores into recv_iter[ ] and storage[ ][ ][ ] arrays. These stores on many computers may be done asynchronously. The only possible non-local loads are for sender gangs from the send_iter[ ] array. In many cases the cost of this operation is much lower than the cost of accessing the storage and, therefore, may be discounted.

An implementation which completely eliminates non-local loads may use Z≥M+N, which is also divisible both by M and N. The smallest of these is Z=L*ceiling((M+N)/L), where L is lowest common multiple of M and N. this may be expressed as: Z=W*N=U*M.

Following this logic, those skilled in the art may appreciated that the recv_iter and storage arrays are still N-by-W arrays. The send_iter[ ][ ] array is an M-by-U array. The index into the send_iter array, then, may be expressed in the following manner: <a,b>=<s/U, s mod U>. In this case, the segment or slice send_iter[k][ ] may be allocated to the region $R_k$.

Pipelining also considers allocation of buffers between non-adjacent stages.

Consider the pipeline illustrated in Table 11. In this example, the stages B and C depend on stage A. Stage C also depends on stage B. For discussion purposes, one (1) gang is assigned to stage A, one (1) gang is assigned to stage C and ten (10) gangs are assigned to B. As a result, ten (10) concurrent iterations of stage B are executed. It follows, then, that only one (1) iteration of stages A and C is executed concurrently.

Let (b, b+10) be the range of iterations executed by gangs of stage B at any point in time. Let c be the iteration of stage C and a be the iteration of stage A. It follows, then, that a≥b+10, since stage A must be executed with all the iterations on which stage B is working. And c<b, for similar reasons. Therefore, a−c≥ 11. This means that stages A and C are at least 11 iterations apart. Table 11 illustrates this example.

TABLE 11

| Gang Time: | 0  | 1  | 2  | 3  | 4  | 5  | 6  | 7  | 8  | 9  | 10  | 11  | 12  |     |
|---|---|---|---|---|---|---|---|---|---|---|---|---|---|---|
| A:  | a0 | a1 | a2 | a3 | a4 | a5 | a6 | a7 | a8 | a9 | A10 | a11 | a12 |     |
| B0: |    | b0 | b0 | b0 | b0 | b0 | b0 | b0 | b0 | b0 | B0  | b10 | b10 | ... |
| B1: |    |    | b1 | b1 | b1 | b1 | b1 | b1 | b1 | b1 | B1  | b1  | b11 | ... |
| B2: |    |    |    | b2 | b2 | b2 | b2 | b2 | b2 | b2 | B2  | b2  | b2  | ... |
| ... | ... |    | ... |    |    | ... |    |    |    |    |     |     |     |     |
| B9: |    |    |    |    |    |    |    |    |    |    | b9  | b9  | b9  | ... |
| C:  |    |    |    |    |    |    |    |    |    |    | c0  |     |     |     |

Therefore, as may be appreciated by those skilled in the art, for the example illustrated in Table 11, there must be at least 12 slots for the buffer between stage A and stage C.

In general, the bounds on the minimum number of slots required between any two stages may be obtained by writing down all the constraints on the ranges of concurrent iterations for each of the stages. Then, for each pair of communicating stages X−>Y, the minimum distance may be determined between the earliest iteration of X and the latest iteration of Y. Since the ranges and the constraints between the iterations are linear inequalities, linear programming techniques may be used to determine these distances. Alternatively a graph-theoretical formulation is possible that propagates the distances top-down within the dependence Directed Acyclic Graph ("DAG") of stages. The details of this formulation should be apparent to those skilled in the art.

Automatic parallelization by a compiler is also considered when pipelining a program.

With appropriate tools, the actual mechanics of implementing the partitioning, figuring out the buffer sizes and synchronization may be done by a tool such as a compiler or translator, under programmer control. Generally, this is accomplished by the programmer, who may add tool-directives to the code (such as pragmas or special comments), which then cause the appropriately coarse-pipelined code to be generated.

Depending on the sophistication of the tool, the programmer may be required to do more or less work. Ideally, the only the constraints on the tool should be: (a) available memory, (b) desired latency, and (c) number of processors. Less sophisticated tools may require the programmer to identify the stage boundaries, gang sizes, etc., as may be appreciated by those skilled in the art.

Code Segment 10 provides one example of a sequential pipeline, which is an input program written in the pipeline form.

```
Code Segment 10 for iteration i = 0, 1, 2, . . . {
    stage1(Data1);
    . . .
    stageN(DataN);
}
```

While this example is provided, as should be appreciated by those skilled in the art, this example should not understood to be limiting of the invention. To the contrary, the input language need not have this exact lexical structure. The program may be written in any number of languages such as C, Fortran or Matlab, among others, as would be appreciated by those skilled in the art. Whichever language a programmer selects, it is assumed that the programmer may transform the code transformed into the form illustrated by Code Segment 10. The details of such transformation from either an imperative or a functional programming language are trivial, as should be apparent to those skilled in the art.

In addition, for this example, it is assumed that dependence and data-flow analysis is performed on the program. The result is the set of dependence or data-flow relations as follows:

(1) Dependence: {D: <A,k>–><B,j>| P(i,j)}. This means that iteration j of stage B depends on iteration k of stage A, and that the predicate P(i,j) is satisfied. Moreover, the dependence arises from the fact that both stage A and stage B read or write within the set of data objects D and that one of the stages writes within the set.

(2) Data-flow: {D:<A,k>–><B,j>| Q(i,j,D)}. This means that the set of data objects D is produced at iteration k of stage A and is consumed by iteration j of stage B. The iterations and the set satisfy the predicate Q(i,j,D). In fact, a data-flow dependence is an instance of a "read-write" dependence.

Data-flow relations tell us precisely which data objects have to be communicated. Dependence relations tell us which iterations have to be synchronized.

Reference is now made to Code Segment 11, below.

```
Code Segment 11 for iteration i = 0, 1, 2, . . . {
    wait for all incoming dependence relations be satisfied
    stagek(Datak);
    mark all outgoing dependencies as satisfied
}
```

The sequential program in Code Segment 11 is relied upon from which is generated a parallel program that does not violate dependence and data-flow relations. Since the target parallel computer is assumed to have a shared memory, code may be generated for each that is consistent with the code segment illustrated in Code Segment 11. A map data structure, such as a hash table, can be used for each dependence relation <A,k>–><B,j> to mark which iterations of stage B become eligible for execution after the iteration k of stage A.

Consider the simple pipeline illustrated in Code Segment 12, which is provided below.

```
Code Segment 12 for i = 0, 1, 2, . . . {
    A: x = . . .;
    B: . . . x . . .;
}
```

There are three dependence relations in this program: (1) write-read dependence from <A,i> to <B,i>, (2) write-write dependence from <A,i> to <A,j> such that j>I, and (3) read-write dependence from <B,i> to <A,j> such that j>i. Intuitively, only the first write-read dependence represents the actual flow of data in the application. The other two dependencies result from the same data object x being used at every iteration.

Data object expansion, such as scalar or array expansion is illustrated in Code Segment 13.

```
Code Segment 13 for i = 0, 1, 2, . . . {
    A: x[i] = . . .;
    B: . . . x[i]. . .;
}
```

Data object expansion is performed to eliminate spurious dependencies. In the example provided by Code Segment 13, x is made into an array indexed by the iteration i. Although be infinitely many iterations are possible, an infinitely number of objects x[i] is not allocated in this example. For simplicity, only as many objects as there are gangs executing the given stage are allocated here.

Code Segment 14 provides an example of program code after renaming and introduction of copies.

```
Code Segment 14 for i = 0, 1, 2, . . . {
    A: xA[i] = . . .; copy xA[i] to xTmp[i];
    B: copy xTmp[i] to xB[i]; . . .xB[i]. . .;
}
```

As may be appreciated by those skilled in the art, the program in Code Segment 14 still may not be suitable for direct translation in a parallel program. It may remain necessary to specify where the object x is to be stored. In fact, several copies of x may need to be maintained if: (1) used by stage A, (2) communicated between stage A and stage B, (3) used by stage B. The object x may need to be separated into local copies for stage A and stage B, and the "message" to be sent between stage A and stage B.

Even on shared memory multi-processor, it may be necessary to be explicit about data movement, since bulk copies between memory regions might be more efficient than individual reads and writes. Moreover, if the bulk copies are not possible between the regions closest to the processors executing stages A and B, then it may be necessary to copy x through a number of stages. The understanding for those skilled in the art is that the message might be implemented in a number of ways, including an asynchronous Direct Memory Access ("DMA") copy.

For our example, suppose a third array xTmp[ ] is allocated as the communication buffer between stage A and stage B. Then the code is transformed.

At this point, the stages may be split into separate processors, such as illustrated in Code Segment 15.

Code Segment 15

```
Processors for stage A execute:
    for i = 0, 1, 2, ... {
        xA[i] = ...; copy xA[i] to xTmp[i];
    }
Processors for stage B execute:
    for i = 0, 1, 2, ... {
        copy xTmp[i] to xB[i]; ...xB[i]...;
    }
```

This code still uses potentially infinite arrays xA[ ], xB[ ] and xTmp[ ]. Observe that xA[ ] requires at least as many elements as there are concurrently executing iterations of stage A. This is the number of gangs allocated to stage A, call it M. Similarly, xB[ ] needs as many elements as there are gangs allocated to stage B, call it N. Since xTmp[ ] is accessed by both stage A and stage B, it needs M+N elements. If there are fewer elements in any of the arrays, then some of the gangs will have to wait before being processed.

For our example, suppose a third array xTmp[ ]is allocated as the communication buffer between stage A and stage B. Then the code is transformed.

Code Segment 16

```
Processors for gang G for stage A execute:
    for i = G, G+M, G+2*M, ... { /* there M gangs */
        xA[G] = ...;
        wait for xTmp[i mod Z] to become available;
        copy xA[G] to xTmp[i mod Z];
    }
Processors for gang H for stage B execute:
    for i = H, H+N, H+2*N, ... { /* there are N gangs */
        wait for xTmp[i mod Z] to contain iteration I;
        copy xTmp[i mod Z] to xB[H]; ...xB[H]...;
    }
```

The remaining step is to allocate the (now finite) arrays xA[ ], xB[ ] and xTmp[ ] to actual memory regions. One solution is to identify for each of the arrays the memory regions in order of preference, or to identify with each memory region and array the cost of allocating the array in the region. Then various heuristics can be used to solve the resulting graph-theoretical or integer-programming problems.

For example, if there is one fast memory region for the stage A, then we can use heuristics for the Knapsack problems to pack arrays used in stage A into the region. These Knapsack problems are described by M. Gary and D. Johnson, in "*Computers and Intractability*," published by W. H. Freedman and Co, 1979. If the region is divided into multiple banks or sub-regions, then heuristics for Subset Sum problems may be used. Other graph-theoretical of integer programming formulations are possible.

As should be appreciated by those skilled in the art, the code is not complete. Other details can be filled in by those skilled in the art. The details include: (1) the use of the underlying Operating System ("OS") Application Programming Interfaces ("APIs") to execute the code on the desired processors, (2) run-time implementation of the map of physical processors onto teams and gangs, and (3) implementation of copying using the efficient machine APIs.

In general, the parallelization process follows the following steps: (1) heuristic work item adjustment; (2) heuristic stage size adjustment; (3) allocation of processors to gangs and teams, and to stages; (4) dependence and data-flow analysis; (5) elimination of spurious dependencies by scalar expansion; (6) renaming of objects and generation of copies; and (7) allocation of objects to local and communication storage.

Observe that in general the problem of finding the optimal solutions to the steps above can be viewed as an AI search problem in space of possible stage sizes, work unit sizes and processor assignments. In some cases, the number of stages can be small enough to be able to enumerate possible solutions. In other cases, Artificial Intelligence ("AI") search techniques might be necessary.

As should be appreciated by those skilled in the art, the code is not complete. Other details can be filled in by those skilled in the art. The details include: (1) the use of the underlying Operating System ("OS") Application Programming Interfaces ("APIs") to execute the code on the desired processors, (2) run-time implementation of the map of physical processors onto teams and gangs, and (3) implementation of copying using the efficient machine APIs.

A potential implementation that simplifies some of analysis sub-problems is described below.

If the stages are nested loops with linear bounds, then a memory footprint is estimated for each stage and iteration by counting feasible points in the corresponding polyhedra. A discussion of this may be found in the article by William Pugh, "*Counting solutions to Presburger formulas: how and why*," in the Proceedings of the Association for Computing Machinery Programming Language Design and Implementation ("ACM PLDI") Conferences, 1994.

Accordingly, the loop is restructured, if possible, to reduce the memory footprint. The details are straight-forward for those skilled in the art, including: (1) by similar technique or by profiling, the work of the stages is estimated; (2) if the stages may be represented by loops, then enlarging the unit of work may be implemented by unroll-and-jam technique (A discussion of this may be found in S. Can and K. Kennedy, "Improving the ratio of memory operations to floating-point operations in loops," ACM Transactions on Programming Languages and Systems, vol. 16, no. 6, pp. 1768-1810, 1994); (3) if the stages may be represented by loops, then the reduction of unit of work may be achieved by tiling the loops with the single outer loop and then folding the iteration of this loop into the main iteration loop; (4) in the source program, the only data objects declared within the scope of the iteration loop are considered candidates for expansion; (5) data-flow analysis is performed at the granularity of the declared objects and re-entrance analysis is used to identify stages that can be instantiated on multiple gangs; (6) data flow and dependence analysis is performed either by solving systems of integer equations and inequalities, or by symbolically executing the stages recording their dependencies; (7) stages are coalesced in order to eliminate cross-iteration dependencies between different stages (which simplifies synchronization); (8) processors are assigned to stages in numbers that balance the resulting run-time; (9) data objects are packed into fast regions either by using a greedy allocation heuristic or by solving a Knapsack or Subset-Sum problem; and (10) the sizes of the communication buffers are determined using the techniques described herein.

With the foregoing in mind, reference is now made to the figures appended hereto. The figures are intended merely to be illustrative of the embodiment(s) and variation(s) discussed herein. As should be appreciated by those skilled in the art, there are numerous additional variations and equivalents that may be employed without departing from the scope of the invention. Those variations and equivalents are intended to be encompassed by the invention.

FIG. 1 is a flow diagram illustrating the basic logic scheme employed by the various embodiments of the invention. As illustrated, the process 10, which concerns parallelization of a pipeline having stages operable on sequence of work items, begins at 12. At 14, an amount of work is allocated for each work item. At 16, at least one stage is assigned to each work item. Naturally, if there is but one work item, only one stage may be assigned at this point. At 18, the at least one stage is partitioned into a least one team. As discussed above, it is contemplated that only one stage may be assigned. At 20, the at least one stage is partitioned into at least one gang. As noted, it is contemplated that, for a particular stage, only one gang may be employed. At 22, at least one team and at least one gang is assigned to at least one processor. At 24, the process ends.

Figure 2:
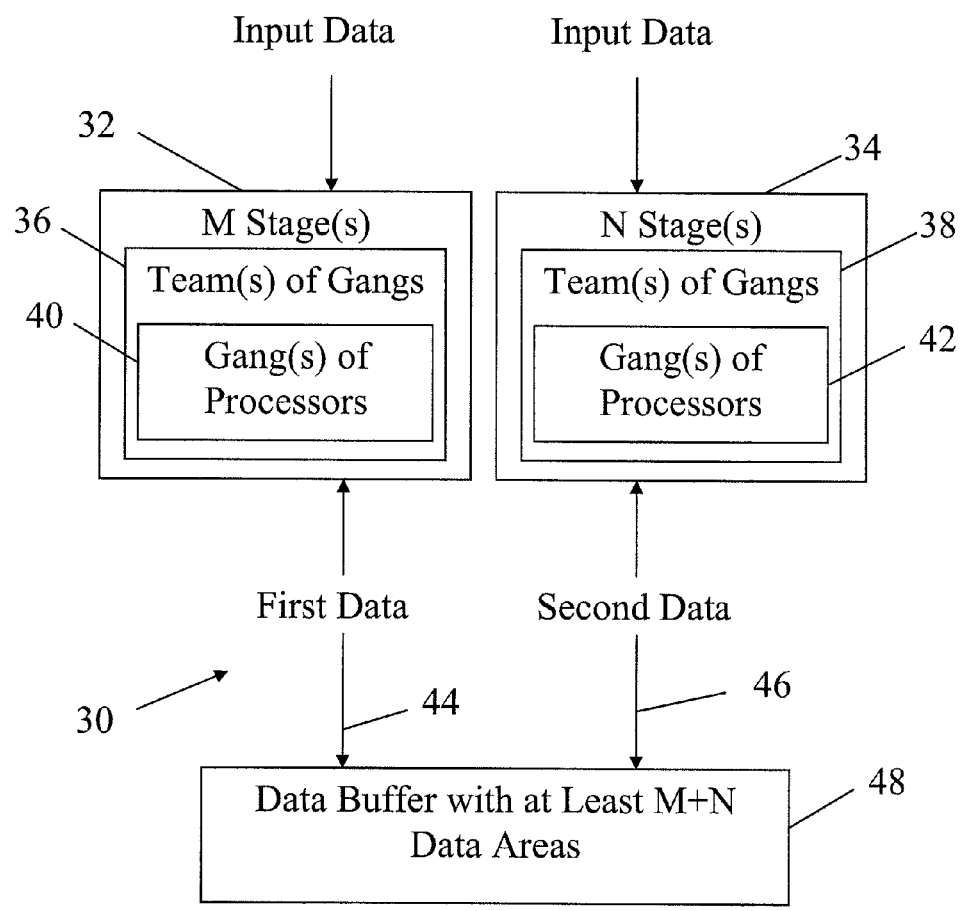
FIG. 2 is a block diagram illustration the organizational scheme employed by embodiment(s) of the invention.

FIG. 2 illustrates an organizational scheme employed by embodiment(s) and variation(s) of the invention. As illustrated, the processing system 30 includes M stage(s) 32 and N stage(s) 34. With an amount of work having been assigned to each work item, the M stage(s) 32 and the N stage(s) are each assigned to the work items. The M stage(s) 32 and the N stage(s) 34 each are partitioned into team(s) 36, 38, respectively. The team(s) 36, 38 are, in turn, partitioned into gang(s) 40, 42, respectively. With this structure, parallel processing of the work items is greatly facilitated so that processing is enhanced, as discussed above.

Communication links 44, 46 connect the M stage(s) 32 and the N stage(s) 34 to a data buffer 48 with at least M+N data areas, as discussed above. The data buffer 48 facilitates communication between the M stage(s) 32 and the N stage(s) 34, as discussed above. It is contemplated that the M stage(s) 32 and the N stage(s) 34 also may communicate directly with one another via another communication link, not illustrated.

As may be appreciated by those skilled in the art, the stages 32, 34, the teams 35, 38, and the gangs 40, 42 may overlap with one another, either partially or completely, depending upon the processing required for a particular sequence of work items. Other variations are also contemplated.

As may be appreciated by those skilled in the art, the examples provided herein are merely exemplary of the scope and breadth of the invention. The invention, therefore, encompasses no only the embodiments described herein but also all equivalents thereto.

What is claimed:

1. A method of parallelizing a pipeline configured to perform a computational process with a series of pipeline stages, the method comprising:

defining a work item for performance by a single iteration across at least two stages comprising a first stage and a second stage, wherein the at least two stages are performed across at least three units of time comprising a current unit of time;

assigning the second stage at the current unit of time to a team of physical processors, where two or more iterations are being performed by the second stage in parallel with another iteration being performed by the first stage at the current unit of time, where the team has a number of physical processors defined by a first number of physical processors, wherein the first number is two or more;

partitioning the team into at least two gangs of physical processors, each gang having a number of physical processors defined by a second number of physical processors less than the first number of physical processors, wherein the at least two gangs are configured such that different gangs process different iterations assigned to the second stage in parallel with each other differently by receiving different iteration outputs from a previous stage and producing different iteration outputs at a future stage for different iterations at the future stage; and processing the different iterations at the second stage at the current unit of time, wherein the processing the different iterations at the second stage at the current unit of time is selected from the group consisting of processing different iterations using different physical processors, different parts of the same iteration using different physical processors and different parts of different iterations using different physical processors.

2. The method of claim 1, wherein determining an amount of work for the work item is based upon at least one of available memory and synchronization overhead.

3. The method of claim 1, wherein the each stage is based upon at least one of load balance and parallelism.

4. The method of claim 1, wherein the first number and the second number are determined based upon at least one of load balance and throughput.

5. The method of claim 1, wherein the second number is determined based upon at least one of work dependency, efficiency of parallelization, memory utilization, and latency.

6. The method of claim 1, wherein assignment of a team and corresponding gang to a number of physical processors is determined based upon at least one of a communication network between the plurality of physical processors and access to memory regions within the physical processors.

7. The method of claim 6, wherein at least one gang is assigned to a plurality of physical processors that are adjacent to one another.

8. The method of claim 6, wherein the at least one team is partitioned into gangs that are adjacent to one another.

9. The method of claim 1, further comprising:

providing a buffer for data produced by a first number of teams, gangs or stages and used by at least a second number of teams, gangs or stages; and wherein the buffer has at least a number of data areas equal to a total of the first and second numbers of teams, gangs, or stages.

10. The method of claim 9, wherein the data areas are continually reassigned such that data stored by the first number of teams, gangs or stages in one cycle is accessible by the second number of teams, gangs or stages in a subsequent cycle.

11. The method of claim 9, wherein the number of data areas is greater than a total of the first and second numbers of teams, gangs, or stages.

12. The method of claim 9, wherein instructions for storing data comprise a send reserve function to obtain a buffer area suitable for a given iteration of the work item and a send commit function indicating that the data is stored and available for reading; and wherein instructions for accessing data include a receive reserve function to obtain data from a buffer area suitable for the given iteration of the work item and a receive commit function indicating that the data is no longer needed.

13. The method of claim 1, wherein the pipeline comprises a plurality of stages, and wherein:
   a first work item requiring a fourth number of work units to complete is assigned to a primary stage;
   a second work item requiring a fifth number of work units to complete different from the fourth number is assigned to a secondary stage;
   the primary stage is assigned to a team having a size defined by a sixth number;
   the secondary stage is assigned to a team having a size defined by a seventh number different from the sixth number;
   wherein a ratio of the fourth number to the sixth number is approximately equal to a ratio of the fifth number to the seventh number.

14. The method of claim 13, wherein a time required for the primary stage to process an iteration of the first work item is approximately equal to a time required for the secondary stage to complete an iteration of the second work item.

15. The method of claim 1, wherein the stage is a data structure identifying a plurality of code segments.

16. A non-transient computer readable medium having stored thereon instructions, that when executed by a computer system, cause the computer system to:
   define a work item for performance by a single iteration across at least two stages comprising a first stage and a second stage, wherein the at least two stages are performed across at least three units of time comprising a current unit of time;
   assign the second stage at the current unit of time to a team of physical processors, where two or more iterations are being performed by the second stage in parallel with another iteration being performed by the first stage at the current unit of time, where the team has a number of physical processors defined by a first number of physical processors, wherein the first number is two or more;
   partition the team into at least two gangs of physical processors, each gang having a number of physical processors defined by a second number of physical processors less than the first number of physical processors, wherein the at least two gangs are configured such that different gangs process different iterations assigned to the second stage in parallel with each other differently by receiving different iteration outputs from a previous stage and producing different iteration outputs at a future stage for different iterations at the future stage; and
   process the different iterations at the second stage at the current unit of time, wherein the processing the different iterations at the second stage at the current unit of time is selected from the group consisting of processing different iterations using different physical processors, different parts of the same iteration using different physical processors and different parts of different iterations using different physical processors.

17. A processor system, comprising:
means for defining a work item for performance by a single iteration across at least two stages comprising a first stage and a second stage, wherein the at least two stages are performed across at least three units of time comprising a current unit of time;
means for assigning the second stage at the current unit of time to a team of physical processors, wherein the team has a number of physical processors defined by a first number of physical processors, wherein two or more iterations are configured to perform the second stage in parallel with another iteration being performed by the first stage at the current unit of time, wherein the first number is two or more;
means for partitioning the team into at least two gangs of physical processors, each gang having a number of physical processors defined by a second number of physical processors less than the first number of physical processors, wherein the at least two gangs are configured such that different gangs process iterations assigned to the second stage in parallel with each other differently by receiving different iteration outputs from a previous stage and producing different iteration outputs at a future stage for different iterations at the future stage; and
means for processing the different iterations at the second stage at the current unit of time, wherein the processing the different iterations at the second stage at the current unit of time is selected from the group consisting of processing different iterations using different physical processors, different parts of the same iteration using different physical processors and different parts of different iterations using different physical processors.

* * * * *